United States Patent
Tisch

(10) Patent No.: US 8,881,705 B2
(45) Date of Patent: Nov. 11, 2014

(54) MASS-BALANCING TRANSMISSION AND METHOD FOR MOUNTING SAME

(75) Inventor: Siegfried Tisch, Gerlingen (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 13/882,295

(22) PCT Filed: Jul. 25, 2011

(86) PCT No.: PCT/EP2011/062737
§ 371 (c)(1),
(2), (4) Date: Apr. 29, 2013

(87) PCT Pub. No.: WO2012/055590
PCT Pub. Date: May 3, 2012

(65) Prior Publication Data
US 2013/0220070 A1 Aug. 29, 2013

(30) Foreign Application Priority Data
Oct. 28, 2010 (DE) .................. 10 2010 049 897

(51) Int. Cl.
*F02B 75/06* (2006.01)
*F16F 15/14* (2006.01)
*F16F 15/26* (2006.01)

(52) U.S. Cl.
CPC ............ *F16F 15/14* (2013.01); *F16F 2230/38* (2013.01); *F16F 2228/001* (2013.01); *F16F 15/264* (2013.01)

USPC ................................. 123/192.2; 74/603

(58) Field of Classification Search
USPC .................... 123/192.2; 74/603, 604
See application file for complete search history.

(56) References Cited

U.S. PATENT DOCUMENTS 8,375,916 B2 *  2/2013  Tisch ................. 123/192.2
2010/0132652 A1  6/2010  Herzog et al.

FOREIGN PATENT DOCUMENTS

| DE | 102007027989 | 12/2008 |
| DE | 102008060084 | 6/2010 |
| JP | 57006142 | 1/1982 |
| JP | 2006002852 | 1/2006 |

* cited by examiner

*Primary Examiner* — Noah Kamen
(74) *Attorney, Agent, or Firm* — Volpe and Koenig, P.C.

(57) ABSTRACT

A mass-balancing transmission of an internal combustion engine (1) is provided, having a transmission housing (8) and a balancing shaft (6) with a bearing point (10, 11) at which the balancing shaft is mounted radially in a bearing seat (12, 13) of the balancing housing, and having an unbalanced section (9) which is formed in one part with the bearing point of the originally shaped balancing shaft. The bearing point is set back radially compared to the unbalanced section with the result that the diameter relationship: $d2 > d1$ applies for the external envelope circle d1 of the bearing point and the external envelope circle d2 of the unbalanced section. Considered in the axial direction of the balancing shaft, the external envelope circle d2 of the unbalance section and the external envelope circle d1 of the bearing point extend offset to one another with an eccentricity of e.

9 Claims, 4 Drawing Sheets

MASS-BALANCING TRANSMISSION AND METHOD FOR MOUNTING SAME

BACKGROUND

The invention relates to a mass-balancing transmission of an internal combustion engine and to a method for mounting this mass-balancing transmission. This transmission comprises a transmission housing and a balancing shaft with a bearing point at which the balancing shaft is supported in the radial direction in a bearing seat of the transmission housing and with an unbalanced section that is formed integrally with the bearing point of the originally formed balancing shaft, wherein the bearing point is set back in the radial direction relative to the unbalanced section, so that, for the outer envelope circle d1 of the bearing point and for the outer envelope circle d2 of the unbalanced section, the following diameter relationship is applicable: $d2 > d1$.

Mass-balancing transmissions with balancing shafts that are originally formed and usually cast or forged and whose bearing point or points are set back in the radial direction relative to the unbalanced section or sections, are known, for example, from JP 2006 2852 A. There, the unbalanced section of the balancing shaft is produced partially from the bearing point that is variable in width in the circumferential direction, but predominantly from the unbalanced section that projects in the radial direction and extends only over a circumferential range of approximately 180°. The unbalanced shaft section defined with respect to the mass balancing of the internal combustion engine can require an unbalanced section with a large envelope circle diameter despite this shape and accordingly an undesirably large mass of the balancing shaft.

SUMMARY

The present invention is based on the objective of providing a mass-balancing transmission of the type mentioned above with improved lightweight structural properties, i.e., a large ratio of unbalanced weight to the mass of the balancing shaft, and also providing an advantageous mounting method for this transmission.

This objective is met, with respect to the device, in that, viewed in the axial direction of the balancing shaft, the outer envelope circle d2 of the unbalanced section and the outer envelope circle d1 of the bearing point are offset relative to each other by the eccentricity e. Compared with the cited prior art with concentric outer envelope circles, the eccentric arrangement of these circles relative to each other has the effect that, for a given unbalanced shaft section, the necessary unbalanced mass can be reduced and accordingly the design engineer can produce a mass-balancing transmission with a high quality of lightweight building materials.

In a refinement of the invention, also viewed in the axial direction of the balancing shaft, the outer envelope circle d1 of the bearing point should be completely within the outer envelope circle d2 of the unbalanced section, so that for the eccentricity e, the following relationship is applicable: $e \leq \frac{1}{2} \cdot (d2 - d1)$. This geometric shape of the balancing shaft with an upwards constrained eccentricity leads to a favorable compromise between high quality of lightweight building materials and—with respect to the necessary packaging space— the smallest possible overall envelope circle diameter. This is understood to be the diameter of a cylinder that envelopes both the bearing point and also the unbalanced section.

It is further provided that the radial bearing of the balancing shaft is a tunnel mounting. Here, the balancing shaft is supported with two bearing points formed on two sides of the unbalanced section in two corresponding bearing seats of the transmission housing and the unbalanced section projects in the radial direction relative to the bearing seats that have the same inner envelope circle d3. Consequently, with the diameter relationship $d3 > d2$, the following relationship is applicable for the eccentricity e: $e > \frac{1}{2} \cdot (d3 - d2)$.

This inequality with downwards constrained eccentricity has the effect that, to the benefit of the quality of lightweight building materials, the unbalanced section projects in the radial direction not only relative to the bearing points on both sides of this unbalanced section, but also relative to the bearing seats in the transmission housing. Nevertheless, the radial mounting of the balancing shaft should involve a so-called tunnel mounting in which the shaft is inserted into closed, i.e., non-separated bearing seats of the transmission housing, as explained below.

Alternatively, the tunnel-mounted balancing shaft can be shaped so that it has a radial bearing point and two unbalanced sections on both sides of this bearing point with the geometric relationships specified above.

With respect to lowest possible friction during operation and simultaneously the most economical design with identical parts, the balancing shaft should be supported at the two bearing points that have the same outer envelope circle d1 by means of two structurally identical anti-friction bearings in the transmission housing. Advantageously, the anti-friction bearings are roller bearings without inner rings and with rollers that roll on the bearing points that are constructed as an inner raceway.

For the axial bearing of the balancing shaft in the transmission housing, a ball bearing arranged adjacent to one of the anti-friction bearings can be provided with an outer ring that is supported, in the axial direction, on the transmission housing on one side by a securing ring inserted in the transmission housing and on the other side by an outer ring of the anti-friction bearing pressed in the bearing seat. With this structural shape, only one securing ring is required, because the axial support of the ball bearing is realized in the other direction on the outer ring of the anti-friction or roller bearing that has been pressed in, i.e., fixed on the housing.

An advantageous mounting method of the mass-balancing transmission with a tunnel-supported balancing shaft is produced when the balancing shaft is inserted into the transmission housing with an axial offset such that, when the unbalanced section passes through one of the bearing seats, the unbalanced section and the bearing seats are essentially concentric to each other. This can be realized via mandrels that hold the balancing shaft on its axial ends, insert the shaft into the transmission housing, and offset the shaft in the radial direction until the bearing points are centered relative to the bearing seats. Alternatively, the housing can also be guided by means of the balancing shaft and offset in the radial direction when the balancing shaft and the housing are positioned relative to each other.

For the radial mounting of the balancing shaft in the transmission housing, two anti-friction bearings are provided, advantageously roller bearings without an inner ring and threaded onto the mandrels and with outer rings that are pressed into the bearing seats by means of slides moving in the mandrels when the balancing shaft is centered.

For the axial mounting of the balancing shaft in the transmission housing, a ball bearing is provided that is arranged adjacent to one of the anti-friction or roller bearings and is threaded onto one of the mandrels and is also inserted into the bearing seat by means of a slide moving on the mandrel. For the axial support of the ball bearing on the transmission housing, a securing ring can be provided that is also threaded on one of the mandrels and is inserted into an annular groove that is adjacent to the outer ring of the ball bearing on the bearing seat by means of a slide moving on the mandrel.

BRIEF DESCRIPTION OF THE DRAWINGS

Additional features of the invention are given in the following description and in the drawings in which an embodiment of a mass-balancing transmission according to the invention and a mounting device for this transmission are shown schematically and/or greatly simplified. Shown are.

DETAILED DESCRIPTION OF THE PREFERRED EMBODIMENTS

Figures 5, 6, 7:
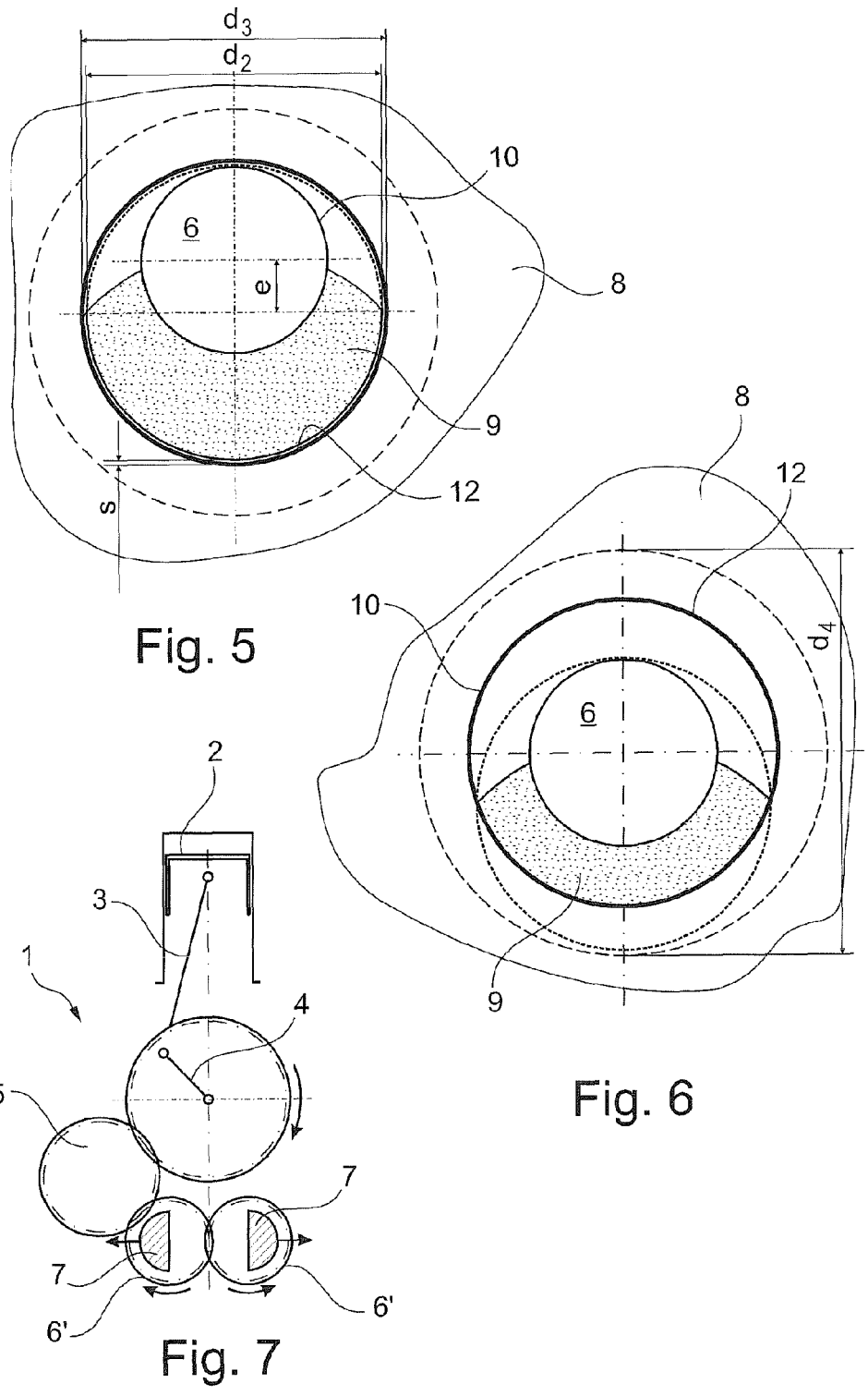
FIG. 5 in a geometric diagram, the balancing shaft according to FIGS. 1 to 3 in the axial offset mounting in the transmission housing according to view I in FIG. 2.
FIG. 6 the mass-balancing transmission according to FIG. 5 after the centering of the bearing.
FIG. 7 in a schematic diagram, an internal combustion engine with known mass balancing of second order.

The invention is described starting with FIG. 7 that shows, with reference to a transmission schematic, a reciprocating piston internal combustion engine in a four-cylinder, inline construction with a mass-balancing transmission that is also known as Lancaster balancing. The internal combustion engine 1 comprises the piston 2 that reciprocate in their cylinders and whose longitudinal movement is converted by connecting rods 3 into the rotation of the crankshaft 4. This drives two balancing shafts 6' with unbalanced sections 7—here by means of an intermediate shaft 5—wherein the balancing shafts 6' rotate in opposite directions relative to the crankshaft 4 at twice the rotational speed of the crankshaft, in order to balance out free inertial forces of second order.

Figure 1:
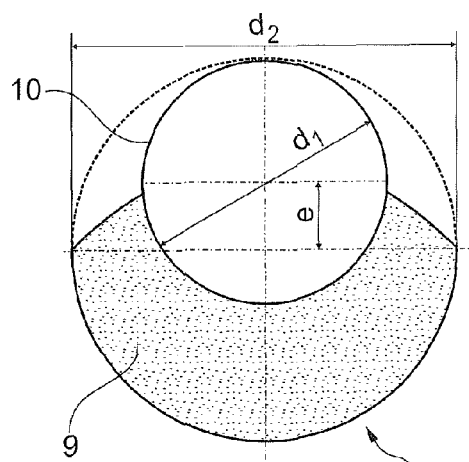
FIG. 1 in a geometric diagram, a balancing shaft according to the invention from view II in FIG. 3.
Figure 2:
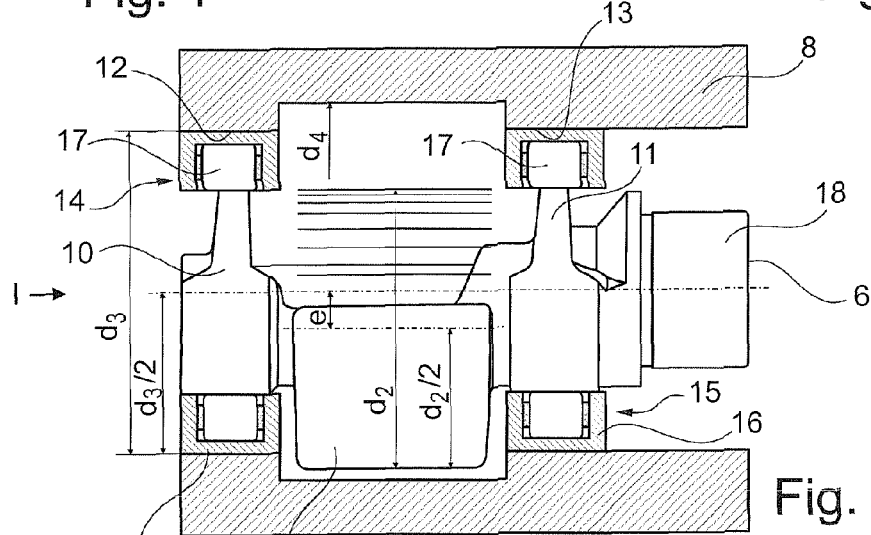
FIG. 2 a mass-balancing transmission according to the invention in the longitudinal section through the transmission housing.
Figure 3:
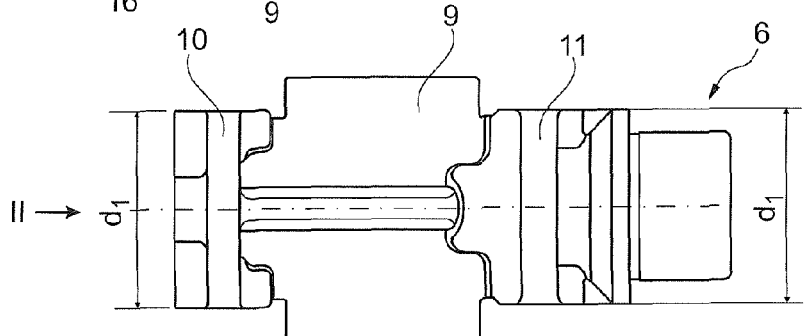
FIG. 3 the balancing shaft according to FIG. 2 in a top view rotated by 90°.

FIGS. 1 to 3 show the geometric features that are essential for understanding the invention for a mass-balancing transmission according to the invention with balancing shaft 6 and transmission housing 8 that is mounted on the not-shown crankcase of the internal combustion engine. The originally shaped balancing shaft 6 finished from an integrally forged steel blank comprises an unbalanced section 9 and two bearing points 10 and 11 that are on both sides of the unbalanced section and on which the shaft 6 is supported in two corresponding bearing seats 12 and 13 of the transmission housing 8. The radial mounting is realized by means of two anti-friction bearings 14, 15, here roller bearings without inner rings and with outer rings 16 that are pressed into the bearing seats 12, 13 and with rollers 17 that roll on the bearing points 10, 11 that are formed as an inner raceway of the balancing shaft 6 made from hardened roller-bearing steel. The inner raceways 10, 11 loaded with a point load due to the revolving unbalanced section are reduced in width on the less loaded side away from the unbalanced section to the benefit of a reduced shaft mass.

As explained below, the bearing peg 18 at the right of the bearing point 11 in FIGS. 2 and 3 is used for holding a grooved ball bearing by which the balancing shaft 6 is supported in the axial direction in the transmission housing 8.

Figure 4:
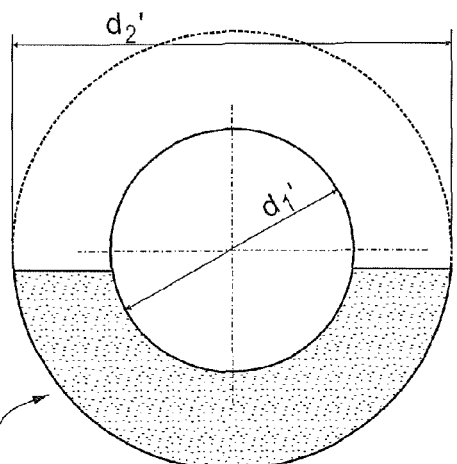
FIG. 4 in a geometric diagram according to FIG. 1, a conventional balancing shaft.

In FIGS. 1 and 2 it can be clearly seen that the bearing points 10, 11 step back in the radial direction relative to the unbalanced section 9, so that the relationship of diameters is applicable for the outer envelope circle d1 of the bearing points 10, 11 and the dotted outer envelope circle d2 of the unbalanced section 9: d2>d1. Different from the outer envelope circles d1' and d2' that are concentric to the axis of rotation of the balancing shaft 6' in the prior art according to FIG. 4, however, the outer envelope circle d2 of the unbalanced section 9 is offset relative to the outer envelope circle d1 of the bearing points 10, 11 by the eccentricity e (the surfaces shown shaded in FIGS. 1 and 4 each show the cross-sectional profile of the unbalanced section 9). For a given unbalanced section, the eccentricity e accompanies an additional reduction in mass compared with the known balancing shaft 6' in FIG. 4.

In addition, the unbalanced section 9 can be constructed with a comparatively small outer envelope circle d2, i.e., d2<d2'. The outer envelope circle d2 of the unbalanced section 9 is simultaneously also the overall envelope circle diameter of the balancing shaft 6, because the outer envelope circle d1 of the bearing points 10, 11 is completely within the outer envelope circle d2 of the unbalanced section 9. In this case, the following geometric relationship is applicable for the eccentricity e: e≤½·(d2−d1). FIG. 1 shows the limit case e=½·(d2−d1) in which the outer envelope circle d2 of the unbalanced section 9 is tangent to the outer envelope circle d1 of the bearing points 10, 11.

The radial mounting of the balancing shaft 6 is a tunnel mounting, i.e., the mounting of the balancing shaft 6 is realized in the transmission housing 8 in the axial direction by inserting the balancing shaft 6 through the non-separated bearing seats 12, 13. Despite the tunnel mounting, the unbalanced section 9 projects in the radial direction relative to the bearing seats 12, 13 that have, for the structurally identical, small, and consequently low-friction roller bearings 14, 15, the same inner envelope circle d3. In geometric terms, with the diameter relationship d3>d2, the following relationship is applicable for the eccentricity e: e>½·(d3−d2), wherein the longitudinal lines that are axis-parallel in FIG. 2 must indicate spatially the outer envelope circle d2 projecting in the radial direction of the unbalanced section 9. The symbol d4 designates the inner diameter of the transmission housing 8 that is free relative to the unbalanced section 9 that revolves during operation (see also the dashed inner diameter d4 in FIG. 6).

The method for mounting the mass-balancing transmission starts from the FIGS. 5, 6, 8, and 9. FIG. 5 shows the principle of how the balancing shaft 6 is passed through the bearing seats 12, 13. This is realized in an axial offset state of the balancing shaft 6, i.e., the shafts of the bearing points 10, 11 and the bearing seats 12, 13 are spaced apart from each other initially parallel, in order to create the required mounting free passage of the unbalanced section 9 relative to the bearing seats 12, 13. In the present case, the outer envelope circle d2 of the unbalanced section 9 is smaller than the inner envelope circle d3 of the bearing seats 12, 13 by a comparatively small gap measure 2·s, so that the unbalanced section 9 and the bearing seats 12, 13 are essentially concentric to each other and the axial offset during the mounting corresponds to the eccentricity e. FIG. 6 shows the mounting position of the mass-balancing transmission after the centering of the bearing points 10, 11 with the bearing seats 12, 13 through radial relative displacement of the balancing shaft 6 in the transmission housing 8.

Figure 8:
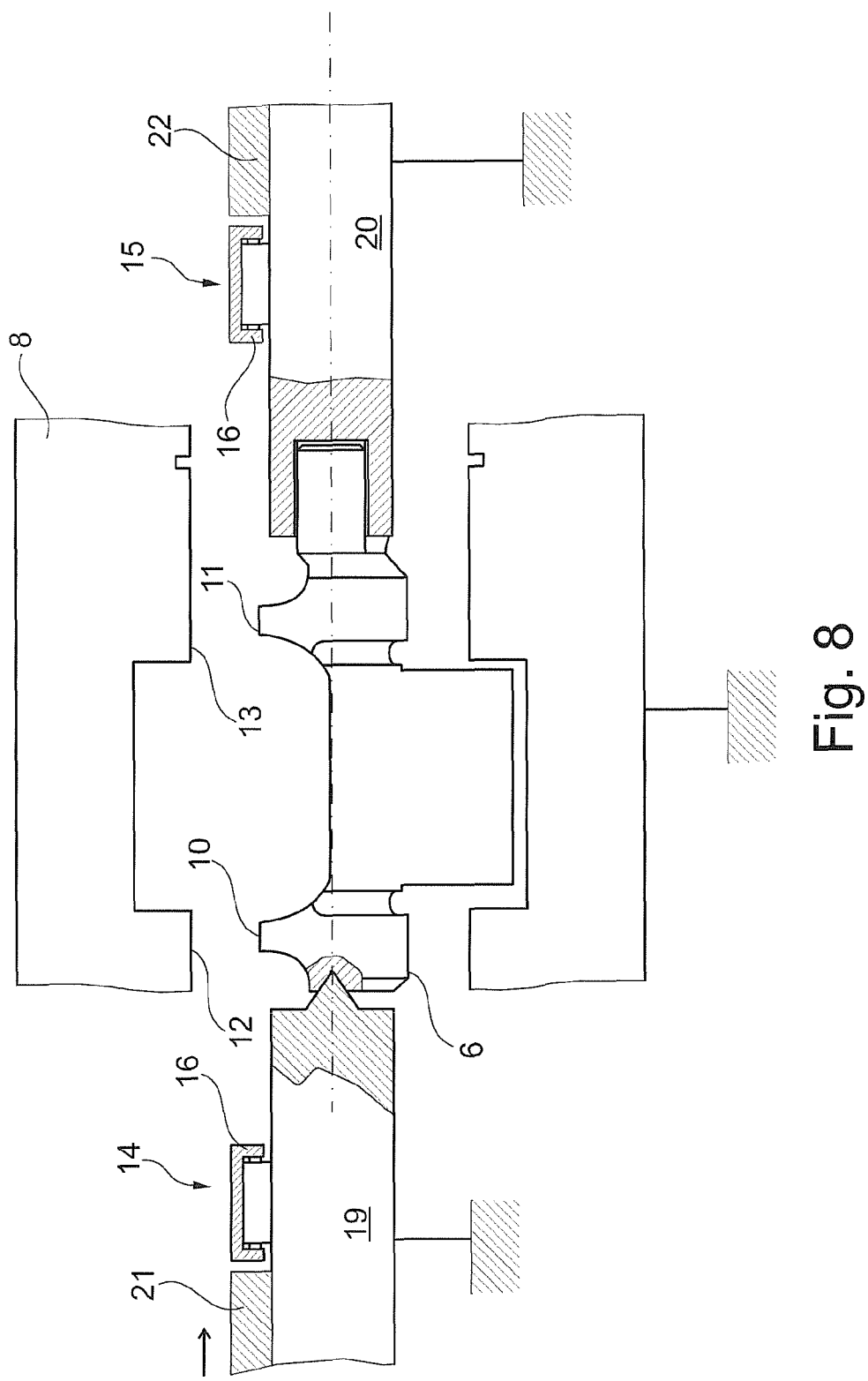
FIG. 8 in a schematic longitudinal section diagram, a mounting device for the mass-balancing transmission at a time before the radial bearing has been pressed in, and FIG. 9 the mounting device according to FIG. 8 at the times before and after the axial bearing has been inserted.
Figure 9:
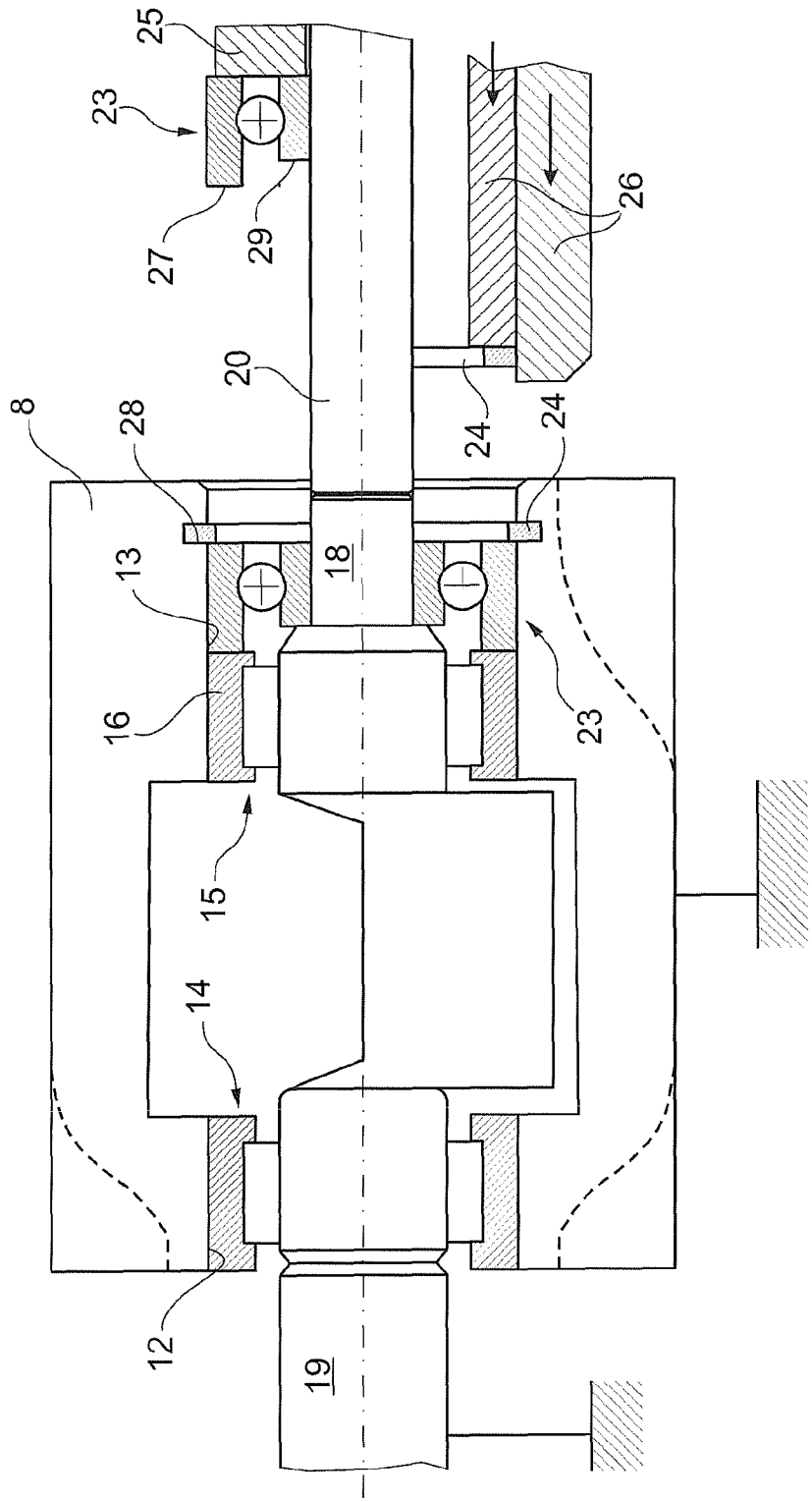

As emerges from FIGS. 8 and 9, the mounting of the balancing shaft 6 in the transmission housing 8 is realized by means of mandrels 19 and 20. These hold the balancing shaft 6 on its axial ends, lead it in the axial offset state into the transmission housing 8, and displace it in the radial direction until the bearing points 10, 11 and the bearing seats 12, 13 are centered relative to each other—as shown. The mandrels 19, 20 are used simultaneously for mounting the roller bearings 14, 15 that are threaded onto the mandrels 19, 20 and their outer rings 16 are pressed by means of slides 21, 22 into the bearing seats 12, 13.

Then the grooved ball bearing 23 and a securing ring 24 that are also threaded on the mandrel 20 are mounted on the bearing peg 18 by means of a slide 25 or 26 or inserted into an annular groove 28 adjacent to the outer ring 27 of the ball bearing 23. The slotted securing ring 24 is held in the separated slide 26 with radial biasing and automatically snaps into the annular groove 28. While the ball bearing 23 is supported in the axial direction on the transmission housing 8 on one side by the securing ring 24 and the annular groove 28, the support on the other side is realized directly on the pressed-in outer ring 16 of the roller bearing 15. The ball bearing 23 has, for this purpose, a modified outer ring 27 that projects on one side relative to the inner ring 29, in order to form a support collar contacting the outer ring 16 of the roller bearing 15. Alternatively, a conventional ball bearing can also be used in connection with a not-shown spacer ring as a support collar between the outer rings 16 and 27 of roller bearings 15 and ball bearings 23.

LIST OF REFERENCE NUMBERS

1 Internal combustion engine
2 Piston
3 Connecting rod
4 Crankshaft
5 Intermediate shaft
6 Balancing shaft
7 Unbalanced section
8 Transmission housing
9 Unbalanced section
10 Bearing point
11 Bearing point
12 Bearing seat
13 Bearing seat
14 Anti-friction/roller bearing
15 Anti-friction/roller bearing
16 Outer ring of the roller bearing
17 Roller
18 Bearing peg
19 Mandrel
20 Mandrel
21 Slide
22 Slide
23 Grooved ball bearing
24 Securing ring
25 Slide
26 Slide
27 Outer ring of the ball bearing
28 Annular groove
29 Inner ring of the ball bearing

The invention claimed is:

1. Mass-balancing transmission of an internal combustion engine, comprising a transmission housing and a balancing shaft with a bearing point at which the balancing shaft is supported in a radial direction in a bearing seat of the transmission housing and with an unbalanced section that is formed integrally with the bearing point of the balancing shaft, the bearing point is set back in the radial direction relative to the unbalanced section, so that, for an outer envelope circle d1 of the bearing point and for an outer envelope circle d2 of the unbalanced section, the following diameter relationship is applicable: d2>d1, and viewed in an axial direction of the balancing shaft, the outer envelope circle d2 of the unbalanced section and the outer envelope circle d1 of the bearing point are offset relative to each other by an eccentricity e, wherein the outer envelope circle d1 of the bearing point is completely within the outer envelope circle d2 of the unbalanced section, so that eccentricity $e \leq \frac{1}{2} \cdot (d2-d1)$.

2. Mass-balancing transmission according to claim 1, wherein a radial mounting of the balancing shaft is a tunnel mounting, the balancing shaft is supported with the two bearing points formed on two sides of the unbalanced section in two corresponding ones of the bearing seats of the transmission housing and the unbalanced section projects in the radial direction relative to the bearing seats that have a same inner envelope circle d3, so that, with the diameter relationship d3>d2, the following relationship is applicable for the eccentricity e: $e > \frac{1}{2} \cdot (d3-d2)$.

3. Mass-balancing transmission according to claim 2, wherein the balancing shaft is supported at the two bearing points that have the same outer envelope circle d1 by two structurally identical anti-friction bearings in the transmission housing.

4. Mass-balancing transmission according to claim 3, wherein the anti-friction bearings are roller bearings without inner rings and with rollers that roll on the bearing points that are constructed as an inner raceway.

5. Mass-balancing transmission according to claim 3, wherein for the axial mounting of the balancing shaft in the transmission housing, a ball bearing is provided that is arranged adjacent to one of the anti-friction bearings and with an outer ring that is supported in the axial direction on the transmission housing on one side by a securing ring inserted in the transmission housing and on the other side by an outer ring of the anti-friction bearing pressed into the bearing seat.

6. Method for mounting a mass-balancing transmission comprising a transmission housing and a balancing shaft with two bearing points at which the balancing shaft is supported in a radial direction in two bearing seats of the transmission housing in a tunnel mounting and with an unbalanced section that is formed integrally with the bearing point of the balancing shaft, the balancing shaft supported with the two bearing points formed on two sides of the unbalanced section in two corresponding ones of the bearing seats of the transmission housing, the bearing point is set back in the radial direction relative to the unbalanced section, so that, for an outer envelope circle d1 of the bearing point and for an outer envelope circle d2 of the unbalanced section, the following diameter relationship is applicable: d2>d1, and viewed in an axial direction of the balancing shaft, the outer envelope circle d2 of the unbalanced section and the outer envelope circle d1 of the bearing point are offset relative to each other by an eccentricity e, wherein the unbalanced section projects in the radial direction relative to the bearing seats that have a same inner envelope circle d3, so that, with the diameter relationship d3>d2, the following relationship is applicable for the eccentricity e: $e > \frac{1}{2} \cdot (d3-d2)$, comprising inserting the balancing shaft into the transmission housing with an axial offset such that the unbalanced section and the bearing seats are essentially concentric to each other when the unbalanced section passes through one of the bearing seats, using mandrels to hold the balancing shaft on axial ends thereof, and inserting the shaft into the transmission housing, displacing the shaft in the radial direction until the bearing points are centered relative to the bearing seats, and for the radial mounting of the balancing shaft in the transmission housing, providing two anti-friction bearings that are threaded onto the mandrels and pressing outer rings of the bearings into the bearing seats using slides moving on the mandrels when the balancing shaft is centered.

7. Method according to claim 6, further comprising for the axial mounting of the balancing shaft in the transmission housing, providing a ball bearing that is arranged adjacent to one of the anti-friction bearings and is threaded on one of the mandrels and is inserted into the bearing seat by an additional slide moving on the mandrel.

8. Method according to claim 7, further comprising for the axial support of the ball bearing on the transmission housing, providing a securing ring that is threaded on one of the mandrels and is inserted into an annular groove adjacent to the outer ring of the ball bearing on the bearing seat by a further slide moving on the mandrel.

9. Mass-balancing transmission of an internal combustion engine, comprising a transmission housing and a balancing shaft with two bearing points that have the same outer envelope circle $d_1$ at which the balancing shaft is supported in a radial direction in a bearing seat of the transmission housing in a tunnel mounting by two structurally identical anti-friction bearings and with an unbalanced section that is formed integrally with the bearing points of the balancing shaft, the bearing points are formed on two sides of the unbalanced section in two corresponding bearing seats of the transmission housing and are set back in the radial direction relative to the unbalanced section, so that, for the outer envelope circle $d_1$ of the bearing points and for an outer envelope circle $d_2$ of the unbalanced section, the following diameter relationship is applicable: $d_2 > d_1$, and viewed in an axial direction of the balancing shaft, the outer envelope circle $d_2$ of the unbalanced section and the outer envelope circle $d_1$ of the bearing point are offset relative to each other by an eccentricity e, wherein the unbalanced section projects in the radial direction relative to the bearing seats that have a same inner envelope circle $d_3$, so that, with the diameter relationship $d_3 > d_2$, the following relationship is applicable for the eccentricity e: $e > \frac{1}{2} \cdot (d_3 - d_2)$, wherein for the axial mounting of the balancing shaft in the transmission housing, a ball bearing is provided that is arranged adjacent to one of the anti-friction bearings and with an outer ring that is supported in the axial direction on the transmission housing on one side by a securing ring inserted in the transmission housing and on the other side by an outer ring of the anti-friction bearing pressed into the bearing seat.

\* \* \* \* \*